United States Patent [19]

Böhm et al.

[11] Patent Number: 5,006,427
[45] Date of Patent: Apr. 9, 1991

[54] STORAGE BATTERY

[75] Inventors: Harald Böhm, Glashütten; Wolfgang Jütting, Ulm; Jork Bretting, Thalfingen, all of Fed. Rep. of Germany

[73] Assignee: AEG Aktiengesellschaft, Frankfurt, Fed. Rep. of Germany

[21] Appl. No.: 462,406

[22] Filed: Jan. 9, 1990

[30] Foreign Application Priority Data

Jan. 9, 1989 [DE] Fed. Rep. of Germany ....... 3900381

[51] Int. Cl.⁵ .......................................... H01M 10/50
[52] U.S. Cl. ................................... 429/101; 429/104; 429/120; 429/159
[58] Field of Search ............... 429/101, 102, 104, 120, 429/148, 159, 26, 161, 210

[56] References Cited

U.S. PATENT DOCUMENTS

| 2,987,568 | 6/1961 | Weininger et al. | 429/210 X |
| 3,533,848 | 10/1970 | Winn | 429/26 |
| 3,880,670 | 4/1975 | Shinn | 429/26 X |

Primary Examiner—Anthony Skapars
Attorney, Agent, or Firm—Spencer & Frank

[57] ABSTRACT

A storage battery having at least two plate-shaped individual cells. Each individual cell has at least one housing wall with projections which lie against a housing wall of the adjacent individual cell while forming channels for a cooling medium. Two mutually adjacent and facing housing walls of two individual cells are electrically conductivity connected, at least at the points of contact of the projections, to form a current conductor, the respective walls being of a different polarity for the respective cells of which they are a part.

21 Claims, 3 Drawing Sheets

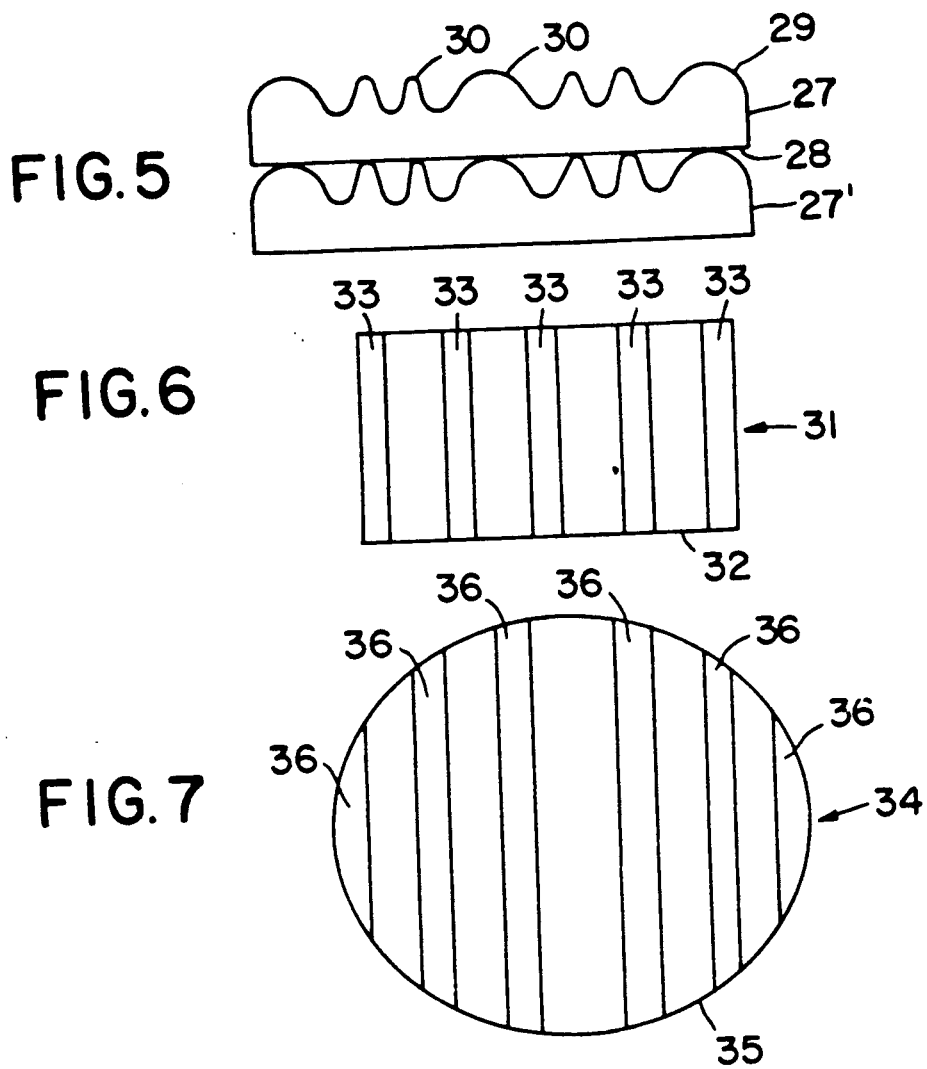
FIG.5
FIG.6
FIG.7
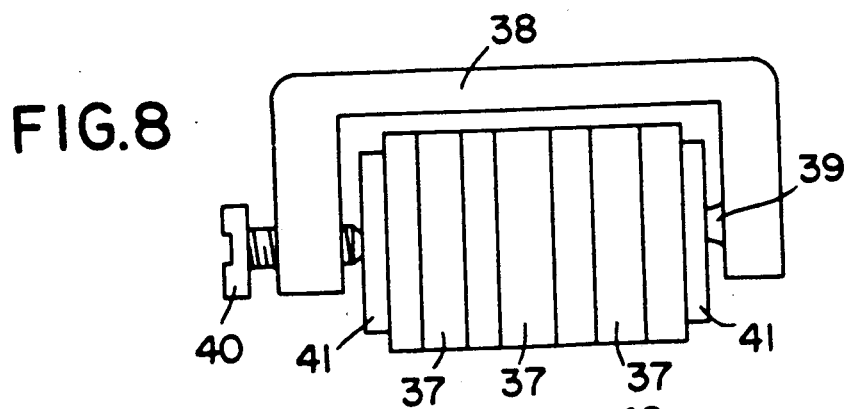
FIG.8
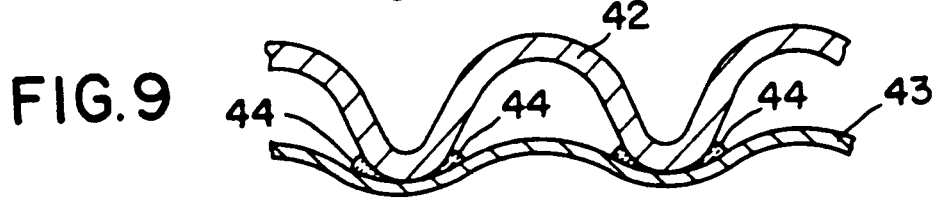
FIG.9

STORAGE BATTERY

REFERENCE TO RELATED APPLICATIONS

This application claims the priority of Federal Republic of Germany application Serial No. P 39 00 381.7 filed Jan. 9th, 1989, which is incorporated herein by reference.

BACKGROUND OF THE INVENTION

The present invention relates to a storage battery having at least two plate-shaped individual cells, each accommodating a solid electrolyte.

High energy batteries equipped with solid electrolytes such as Na/S batteries or zebra batteries, are at present normally constructed as cylindrical cells having a tube shaped ceramic (solid) electrolyte (U-shaped in longitudinal section) composed of $\beta$-$Al_2O_3$. This is described in detail in Engelis, Birnbreier and Haase, ETZ Vol. 14 (1987) pages 658–664, and in Dell, Bones, B. Electrochem 4(4), 319 (1988). The cells of the battery are equipped with first and second poles ($+$ and $-$), with the cell housing generally constituting the second pole. The first pole is brought out of the top of the cylinder and is connected to a central or inner electrode within the housing which is separated from the housing by the electrolyte and a surrounding outer electrode. Within the battery, the cells are connected in series by appropriately connecting the positive pole of the one cell with the negative pole of the following cell so as to build up appropriate voltages in the battery. This means that in the construction of the battery, the interconnection of the cells involves welding and installation work.

During operation of such a high power battery, the internal resistance of the cells creates heat. Due to the cylindrical construction of the cells, this heat can be dissipated only by way of an electrode, that is, the electrode nearest the housing (the outer electrode). The inner electrode must conduct the heat developed there through the ceramic of the electrolyte to the outer electrode and from there to the outside via the housing. This produces a temperature gradient in the interior of the cell. To avoid thermal overloads in the cells, it is necessary that the magnitude of the power or its duration, and the throughput of cooling air be selected so that system specific temperature limits cannot be exceeded.

SUMMARY OF THE INVENTION

It is therefore an object of the present invention to construct cells of a battery in such a manner that uniform cooling of the cell is realized with low expenditures of energy for cooling and a minimal temperature gradient within the cells, with a simple battery configuration having simple interconnections.

This is accomplished by the present invention in that at least one housing wall of each individual cell is provided with spaced apart projections which lie against a housing wall of an adjacent individual cell. The projections form channels between them for a cooling medium. Each pair of adjacent mutually facing housing walls of adjacent individual cells are arranged, at least at the points of contact of their projections, to be conductors of electrical current, each for a different polarity. The invention is based on the principle of shaping the housing wall in such a manner that channels for a cooling medium are formed between the individual cells when they are assembled together, e.g. stacked. Preferably air or alternatively a coolant, is employed as the cooling medium. The cooling air may be generated by a ventilator or blower. The series connection results in a very simple structure of the storage battery. A desired multiple of the voltage of an individual cell can be realized by connecting a corresponding number of individual cells in a row (stack). The housing walls are preferably composed of metal. By arranging the individual gels in a stack, they are electrically connected in series. The housing walls at the ends of a stack of individual cells thus carry different polarities. The sum of the voltages of the individual cells is available at the ends.

In order to make available a larger housing surface for cooling, it is advisable to provide two opposing housing walls of each individual cell with the projections The plate-shaped, i.e. flat, individual cells include a flat, i.e. plate-shaped, solid electrolyte provided with insulating members along its edges to which the two housing walls of the individual cell are fastened. The housing walls may have the form of caps. The two housing walls of an individual cell are electrically insulated from one another by the insulating members (which may be in the form of one or more strips of insulating material). The housing walls can therefore be made entirely of metal. Planar individual cells can be installed in a tight and space-saving manner even if they are provided with projections for establishing cooling channels.

Housing walls having corrugations in the form of parallel, wave-shaped raised portions are favorable and are easily manufactured. It is particularly expedient for the wave-shaped raised portions on two opposing sides of the adjacent individual cells to have different heights and the same wave lengths. The contacting locations of the walls of adjacent individual cells then have low transfer resistances, which is an advantage with respect to keeping heat losses low when high currents are developed.

Flat cells are known in the literature. In the above-mentioned ETZ reference, a flat cell is illustrated to describe the principle of a storage cell operating with a solid electrolyte (Na/S cell). Surprisingly, only cylindrical cells have been developed further for practical use. This may be justified in connection with individual cells by the lower development costs, but for batteries it results in the above-described drawbacks.

The present invention makes available a cell structure which meets the requirements for individual cells as well as those for batteries composed of individual cells.

BRIEF DESCRIPTION OF THE DRAWINGS

These and other features and advantages of the invention may be more completely understood from the following detailed description of the preferred embodiments of the invention with reference to the accompanying drawings in which:

FIG. 5 is a side view of two individual cells arranged in series;

FIG. 6 is a front view of an individual cell having housing walls of rectangular contour;

FIG. 7 is a front view of an individual cell having housing walls of circular contour;

FIG. 8 is a side view of a storage battery comprising clamping means for clamping individual cells together; and FIG. 9 is a cross-sectional view of two housing walls of adjacent individual cells connected by welding.

DESCRIPTION OF THE PREFERRED EMBODIMENTS

Figure 1:
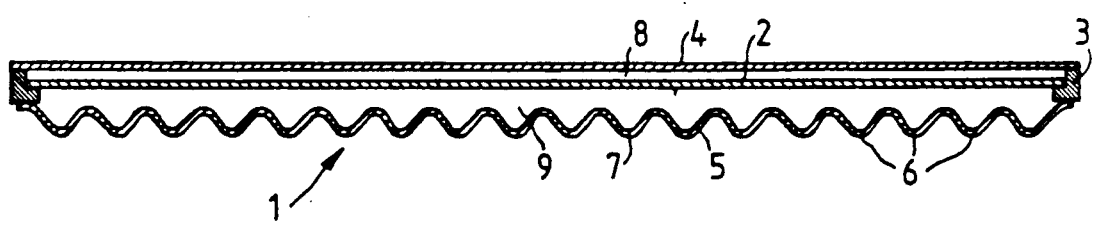
FIG. 1 is a cross-sectional view of an individual cell according to one embodiment of the invention.

Referring to FIG. 1, an individual cell 1 is generally flat, i.e. plate-shaped, and includes a flat solid electrolyte 2 which can be in the form of a planar plate. The solid electrolyte 2 may be a ceramic electricity composed of $\beta$-aluminum oxide ($\beta$-Al$_2$O$_3$) which conducts sodium ions. Metal housing components 4 and 5, whose respective edges are connected with insulative edge members 3, are arranged on either side of the solid electrolyte. Edge members 3, which may be in the form of a strip of insulative material, electrically insulate the housing components 4 and 5 from one another. Housing components 4 and 5 respectively form the positive and negative poles of an individual cell 1. Metal component 4 is in the shape of a planar plate and defines a planar housing wall of the cell 1. Housing component 5, also defining a housing wall of the cell, is provided with projections 6 whose outer ends lie in an imaginary plane (not illustrated in the drawing). In the preferred embodiment, the housing component 5 is corrugated with parallel wave-shaped corrugations, the individual wave-shaped corrugations forming the respective projections 6. Between the solid electrolyte 2 and the housing components 4 and 5, there extend respective cavities 8 and 9 which respectively receive the substance of the negative electrode, e.g. sodium, and the substance of the positive electrode, e.g. nickel chloride together with the additional electrolyte NaAlCl$_4$ in the case of the zebra cell.

With the housing component 4 of an individual cell 1 forming a planar housing wall resting on the corrugated housing component 5 which forms a housing wall of an adjacent individual cell as in the embodiment of FIG. 1, the housing walls define channels extending from one edge of the respective walls to an opposite edge, so that a cooling medium, e.g. air, is able to pass therethrough. Moreover, with this arrangement the positive pole of the one individual cell and the negative pole of the other individual cell are electrically connected with one another so that the individual cells are electrically connected in series.

Figure 2:
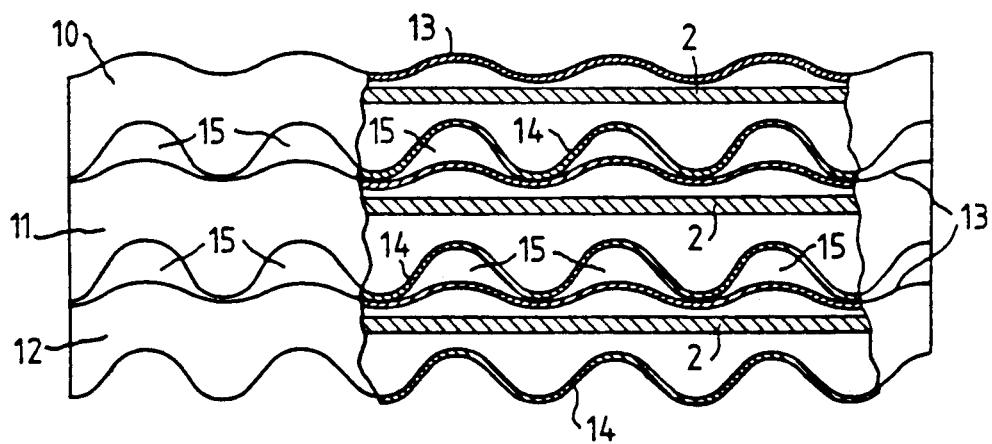
FIG. 2 is a partial cross-sectional side view of several individual cells arranged in series, according to another embodiment of the invention.

It is also favorable for both housing components of one individual cell, i.e. the positive pole and the negative pole, to have corrugated surfaces. Cells of a battery of this type are shown in FIG. 2. The individual cells 10, 11 and 12, which contain the same solid electrolyte 2, each have corrugated housing walls 13 and 14 on the respective two opposite sides of their housings. The spacing (length) of the waves (corrugations) in these housing walls is identical, while the height of the waves is different. The three individual cells 10, 11 and 12 are overlaid on one another (in phase), with housing walls 13 and 14 of adjacent individual cells 10 and 11, 12, respectively, contacting one another while forming channels 15. For each cell, the wave height of the negative pole, i.e. that of housing wall 13, is lower than that of the positive pole, i.e. that of housing wall 14.

When cells 10, 11 and 12 are (1) stacked on one another, i.e. with each of the cells 10, 11, 12 lying flat, or (2) stacked in horizontal abutment, i.e. with each of the cells upright, then the corrugations of the one housing component of the first cell, e.g. housing component 14 of cell 10, engage directly in the corrugations of the other housing component of the next following cell, e.g. housing component 13 of cell 11. Due to the differences in height of the corrugations, channels 15 are created which serve to conduct a cooling medium, e.g. cooling air. Additionally, the lining up of the cells produces directly the series connection of cells 10, 11 and 12.

The cell stack is merely clamped together with a mechanical, electrically insulated, clamping member, thereby to minimize the electrical transfer resistance between adjacent cells. For example, as show in FIG. 8, several individual cells 37 arranged in series may be connected by pressure provided by a frame. The frame is provided with a pressure plate 39 and a screw 40. Isolating plates 41 should be provided between the pressure plate 39 and/or the screw 40, and the respective outer walls of the outer cells 37 for electrically insulating the frame from the cells.

It is of course also possible to realize the desired circuit by additional screwing, welding or soldering of discrete cell-to-cell connections. For example, referring to FIG. 9, if a rigid connection between individual cells is required there may be provided soldered or welded connections 44 between touching wall sections 42, 43 of adjacent cells.

In the case of cells according to the embodiment of FIG. 1 having a smooth surface on one side and a corrugated surface on the other, the procedure is quite analogous. By lining up the smooth side of the first cell with the corrugated side of the following cell, the series connection is realized with simultaneous formation of the channels for the cooling air.

In both embodiments (FIGS. 1 and 2), the individual cells are cooled on both sides by the incoming cooling air, and temperature gradients within a cell are minimized. By stacking the individual cells in the battery, a series connection is automatically realized which is often obligatory to generate the voltages required in practice from the voltages of the individual cells. In the case of a zebra cell, the rest potential for Na/NiCl$_2$ is 2.59 V.

It is possible for each individual cell to have circular, square or rectangular geometry, i.e. its broadsides, defined by planes parallel to the housing walls, are circular, square or rectangular. Thus, for example, in FIG. 6 there is shown a front view of a individual cell provided with a wall 31 having a rectangular outline. The outline may also be square. The wall 31 is provided with projections of rectangular cross section.

While for square and rectangular cells, all parallel channels have the same length and pose the same air resistance, the channels in circular cells become shorter the closer they come to the edge since the boundaries of the housing walls, in which the channels open, would be circular, and thus, with unchanging channel geometry, the air resistance becomes increasingly smaller. However, the loss of power in circular cells is greatest in the center. Therefore, the channel cross section of a circular cell is selected to become increasingly smaller, the closer the channel lies to the edge. It has been found to be favorable to keep the ratio of channel length to wave length (channel width) the same for all channels of a circular cell. An individual cell 34 having a wall 35 of circular outline is shown in FIG. 7. The wall 35 is provided with projections 36 which may have rectangular cross sections. The channels surrounded by the projections 36 of the cell 34 and an adjacent cell not shown in FIG. 7 have a length-to-width ratio which is the same for every one of these channels.

Figure 3:
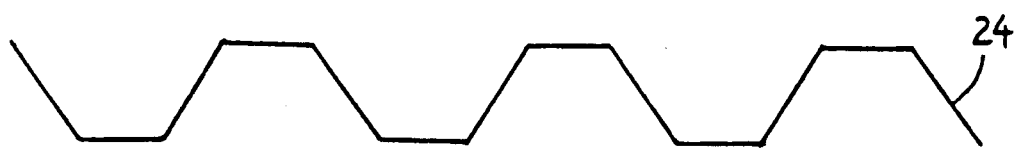
FIG. 3 is a partial end view of a housing wall with corrugations having a trapezoidal cross section according to the invention.
Figure 4:
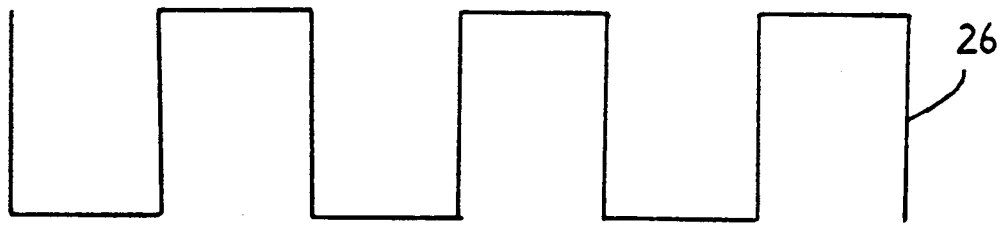
FIG. 4 is a partial end view of a housing wall with corrugations having a rectangular cross section according to the invention.

It has further been found that the shaping of the housing components need not absolutely be that of waves. Trapezoidal corrugation 24 as illustrated in FIG. 3 or rectangular corrugations 26 as illustrated in FIG. 4 meet the same purpose insofar as cooling channels are created when the cells are lined up and a series connection is realized automatically.

Irregular raised portions on the housing components, such as linearly extending bulges or hump-like raised portions which lead to a series connection when the cells are lined up and leave spaces therebetween for guiding the air, are also suitable. In FIG. 5 two individual cells 27, 27' are shown. Each cell is provided with a flat wall 28 and a wall 29 having irregularly shaped projections 30. The tops of the projections 30 of cell 27' contact the flat wall 28 of the cell 27.

Generally, projections or raised portions in the housing components are understood to include all measures which lead to the formation of spaces serving as coolant conductors when the cells are lined up. Thus, spacer members which are not an integral component of the housing wall may also be inserted. Such spacer members may be fastened to the housing components in a frictionally locking and/or form locking manner. Some of the heat emanating from the individual cells is here conducted directly to the cooling medium through the housing wall and some by way of the spacer members.

The cooling medium may also be positively moved, with the cooling medium volume per unit time being adapted to the generated heat in that, for example, the temperature in the cooling channels is kept constant by means of a regulating system.

It will be understood that the above description of the present invention is susceptible to various modifications, changes and adaptations, and the same are intended to be comprehended within the meaning and range of equivalents of the appended claims.

What is claimed is:

1. In a storage battery having first and second individual plate-shaped cells, each cell having (1) a positive pole and a negative pole, (2) positive and negative electrodes disposed between the poles and respectively contacting the positive pole and the negative pole, and (3) an electrolyte between the electrodes, the improvement wherein:

said first cell overlies said second cell;

one of the positive pole and the negative pole of each of said first and second cells is a first electrically conductive wall having a first polarity and the other of the positive pole and the negative pole of each of said first and second cells is a second electrically conductive wall having a second polarity; and said first wall of said first cell has first electrically conductive projections which contact said second wall of said second cell, so that said first projections electrically connect said first wall of said first cell to said second wall of said second cell and define means, in the form of cooling channels between said first wall of said first cell and said second wall of said second cell, for carrying a cooling medium between said first and second cells.

2. A storage battery as in claim 1, wherein said first and second walls of each of said first and second cells are formed of metal.

3. A storage battery as in claim 1, wherein said second wall of said second cell has second electrically conductive projections.

4. A storage battery as in claim 1, wherein said second wall of said second cell has second electrically conductive projections and said first and second projections are parallel corrugations respectively formed in said first wall of said first cell and said second wall of said second cell.

5. A storage battery as in claim 4, wherein the corrugations in said first wall of said first cell and said second wall of said second cell are wave-shaped and have different wave heights and a same wave length.

6. A storage battery as in claim 1, wherein said first projections are parallel corrugations formed in said first wall of said first cell.

7. A storage battery as in claim 6, wherein first corrugations are trapezoidal in cross section.

8. A storage battery as in claim 6, wherein first corrugations are rectangular in cross section.

9. A storage battery as in claim 6, wherein said first projections are raised portions of said first wall of said first cell which are irregularly shaped.

10. A storage battery as in claim 1, wherein said first and second cells are rectangular in planes parallel to said first and second walls of each of said first and second cells.

11. A storage battery as in claim 1, wherein said first and second cells are square in planes parallel to said first and second walls of each of said first and second cells.

12. A storage battery as in claim 1, wherein said first wall of said first cell an said second wall of said second cell have circular boundaries.

13. A storage battery as in claim 12, wherein said channels are straight, parallel to each other and open at said circular boundaries of said first and second walls, each of said channels having a length and a width, and having a length-to-width ratio which is the same for every channel.

14. A storage battery as in claim 1, further comprising an electrically insulated means for clamping said first and second cells together.

15. A storage battery as in claim 1, further comprising means for mechanically clamping said first and second cells together with a compressive force and means for fixing said first and second walls of said first and second cells with discrete connections, each discrete connection consisting of one of a weld, a soldered connection and a discrete mechanical connection.

16. A storage battery as in claim 1, having a stack of individual plate-shaped cells, the stack including said first and second cells, the positive pole of one of the cells of the stack is disposed at one end of the stack and the negative pole of another of the cells of the stack is disposed at the other end of the stack, the battery further comprising first and second terminals on a top side of the battery, said first terminal being electrically connected to the positive pole of said one of the cells of the stack, said second terminal being electrically connected to the negative pole of said another of the cells of the stack, the cells of the stack being stacked horizontally with respect to said top of the battery.

17. A storage battery as in claim 1, having a stack of individual plate-shaped cells, the stack including said first and second cells, the positive pole of one of the cells of the stack is disposed at one end of the stack and the negative pole of another of the cells of the stack is disposed at the other end of the stack, the battery further comprising first and second terminals on a top side of the battery, said first terminal being electrically connected to the positive pole of said one of the cells of the stack, said second terminal being electrically connected to th negative pole of said another of the cells of the stack, the cells of the stack being stacked vertically with respect to said top of the battery.

18. A storage battery as in claim 1, wherein the battery is a zebra battery.

19. A storage battery as in claim 1, wherein the negative electrode of each cell comprises sodium and the positive electrode of each cell comprises nickel chloride.

20. A storage battery as in claim 1, wherein the negative electrode of each cell comprises sodium and the positive electrode of each cell comprises sulfur.

21. A storage battery as in claim 1, wherein said electrolyte is formed as a flat solid block.

* * * * *